April 25, 1933.  J. L. BIXBY  1,905,134
MOLD AND BONDING MEANS
Filed March 14, 1931
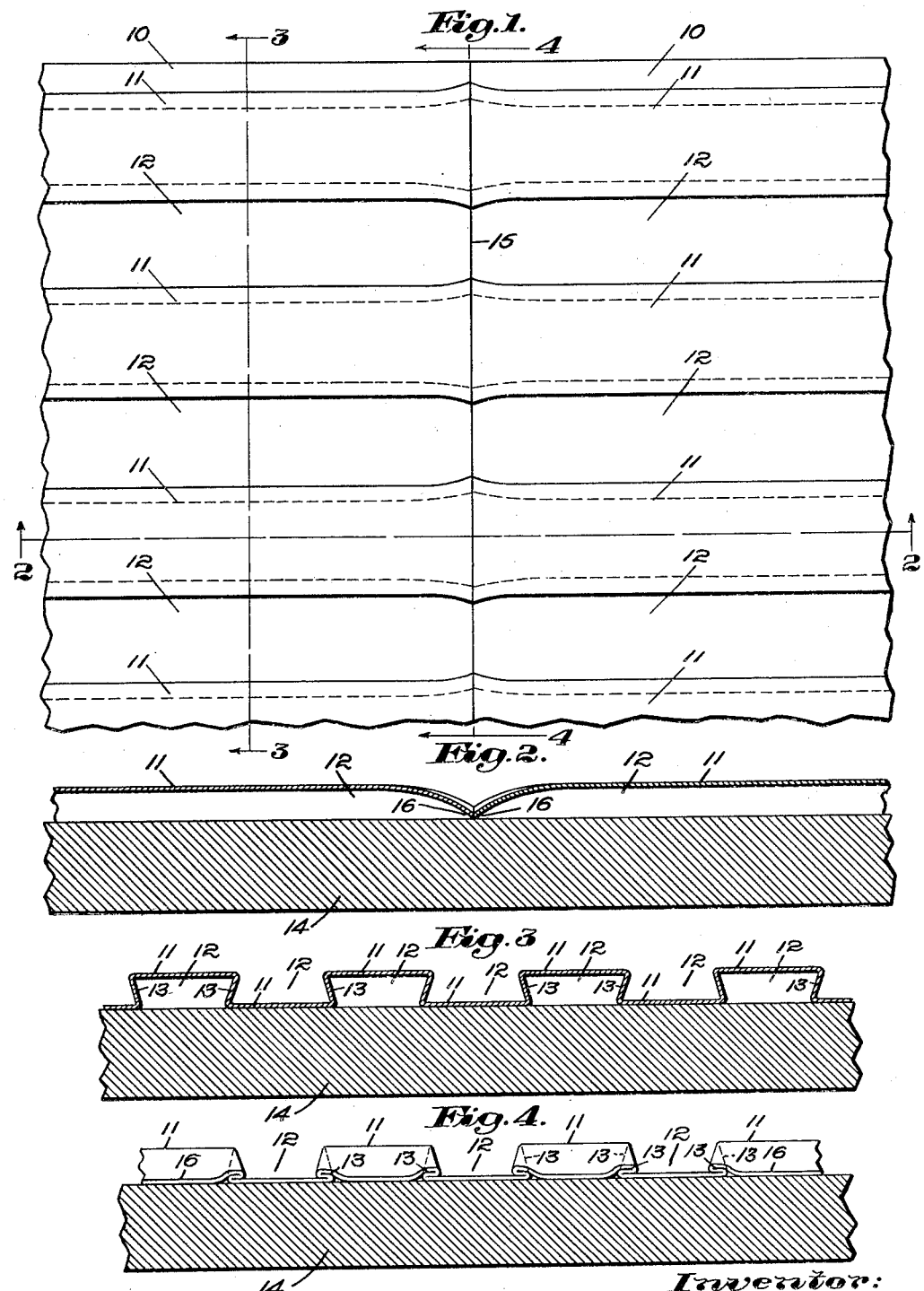

Patented Apr. 25, 1933

1,905,134

UNITED STATES PATENT OFFICE

JOHN L. BIXBY, OF ARLINGTON, MASSACHUSETTS, ASSIGNOR TO KE-BOND COMPANY, INCORPORATED, OF BOSTON, MASSACHUSETTS, A CORPORATION OF MASSACHUSETTS

MOLD AND BONDING MEANS

Application filed March 14, 1931. Serial No. 522,687.

This invention relates to a molding form comprising plates having keys in the form of dove-tail corrugations alternating with dove-tail grooves, which key the plates to plastic material, such as concrete, and which subsequently key another layer of plastic material, such as plaster, to the plates. In other words, the plates which constitute parts of the molding form become parts of the completed building structure. In assembling the plates, and the supports therefor, the plates are placed edge to edge flatwise against the support, with the corrugations of one plate preferably in alignment with the corrugations of another, with the grooves of one plate in alignment with the grooves of such other plate, and with the corrugations and grooves of both plates transverse to the abutting edges of the plates.

Heretofore, in the use of molds or forms of this character, the plastic concrete would leak through between the abutting edges, and would enter the dove-tail grooves on the side next to the supporting portions of the forms. In accordance with my invention, the ends of the grooves next to the supporting forms are closed, thereby preventing concrete from entering the grooves on the under side of the sheet. In the specific embodiment disclosed herein, the closing of the grooves is conveniently accomplished by flattening the corresponding corrugations adjacent to the abutting edges of the plates.

The invention will best be understood by reference to the following description, when taken in connection with the accompanying drawing of one specific embodiment thereof, while its scope will be pointed out more particularly in the appended claims.

In the drawing:

Fig. 1 is a plan of a concrete molding form comprising a pair of edgewise-abutting bonding sheets embodying my invention;

Fig. 2 is a sectional view on line 2—2 of Fig. 1;

Fig. 3 is a sectional view on line 3—3 of Fig. 1; and

Fig. 4 is a sectional view on line 4—4 of Fig. 1.

Referring to the drawing, and to the embodiment of the invention which is illustrated therein, there is shown a pair of bonding sheets 10, each of which is bent to present on each side dove-tail corrugations 11 (see Fig. 3), alternating with dove-tail grooves 12, each corrugation having two sloping sides 13, which overhang the contiguous grooves. In other words, each plate presents oppositely-directed, hollow dove-tail corrugations presenting grooves on opposite sides, respectively, of the plate.

The two plates are placed flatwise against an appropriate support 14, which may consist of boards placed edge to edge. The plates, which are more or less flexible, may be secured to this support, and are held definitely positioned. The plates abut edge to edge along a line 15 (see Fig. 4), which is transverse to the corrugations and grooves, and the corrugations of one plate may be and herein are in alignment, or register with the corrugations of the other. As plastic concrete is likely to leak through between the abutting edges of the plates and enter the grooves on the under side next to the support 14, I have closed the ends of these grooves, as by flattening the corresponding corrugations along abutting edges (see Figs. 2 and 4), as at 16. One convenient way of accomplishing this is to place the plate in a shearing machine, and to cause the movable knives of the machine to descend upon the corrugations which are to be flattened. The pressure of the knife collapses the corrugations, squeezes them down, and finally severs the plate, leaving its edge with the appearance shown in Fig. 4. The corrugations in question diminish in depth (see Fig. 2) along a curved line, and their edges spread slightly (see Fig. 1). The edge of the sheet is left fairly smooth and straight, subject of course to some slight irregularities, due to the flattening of the corrugations.

When the concrete is poured, none will enter the grooves on the side next to the supporting form 14. However, the concrete enters the grooves on the other face of the sheet, and therefore becomes bonded to the latter. After the concrete has become hardened sufficiently, the support 14 is removed, and the layer of plaster is applied to the bonding sheets, the plaster entering the grooves which were next to the support. As no concrete could leak into these grooves, the bonding of the plaster to the sheets is therefore much more permanent and satisfactory than would otherwise be the case.

Having thus described one embodiment of the invention, but without limiting myself thereto, what I claim and desire by Letters Patent to secure is:

1. As a new article of manufacture, a bonding sheet comprising a plate having oppositely directed, hollow, dove-tail corrugations presenting grooves on opposite sides thereof, the corrugations on one side being closed along an edge which is transverse to said corrugations.

2. As a new article of manufacture, a bonding sheet comprising a plate bent to present oppositely directed, hollow, dove-tail corrugations presenting grooves on opposite sides thereof, the corrugations on one side diminishing in depth toward an edge which is transverse to said corrugations and being closed along said edge.

3. As a new article of manufacture, a bonding sheet comprising a plate bent to present on each side dove-tail corrugations alternating with dove-tail grooves, each corrugation having two sloping sides which overhang the contiguous grooves, each corrugation on one side of the plate being flattened along an edge which is transverse to said corrugations and closing the corresponding groove on the other side of the plate.

4. Bonding means comprising two bonding sheets abutting edge to edge, each sheet comprising a plate bent to present on each side dove-tail corrugations alternating with dove-tail grooves transverse to said abutting edges, the grooves on the same side of both plates being closed along said abutting edges.

5. Bonding means comprising two bonding sheets abutting edge to edge, each sheet comprising a plate bent to present on each side dove-tail corrugations alternating with dove-tail grooves transverse to said abutting edges, the grooves on the same side of both plates being closed along said abutting edges, and means to hold said plates in abutting relationship.

6. A mold for plastic material such as concrete, the same comprising in combination a support, and two bonding sheets disposed flatwise against said support and abutting edge to edge, each plate being bent to present on each side dove-tail corrugations alternating with dove-tail grooves transverse to said abutting edges, the grooves on the sides which are disposed toward said support being closed along said abutting edges.

In testimony whereof, I have signed my name to this specification.

JOHN L. BIXBY.